July 9, 1929.  F. B. LIER  1,720,488
TOBOGGAN COASTER
Filed April 21, 1927
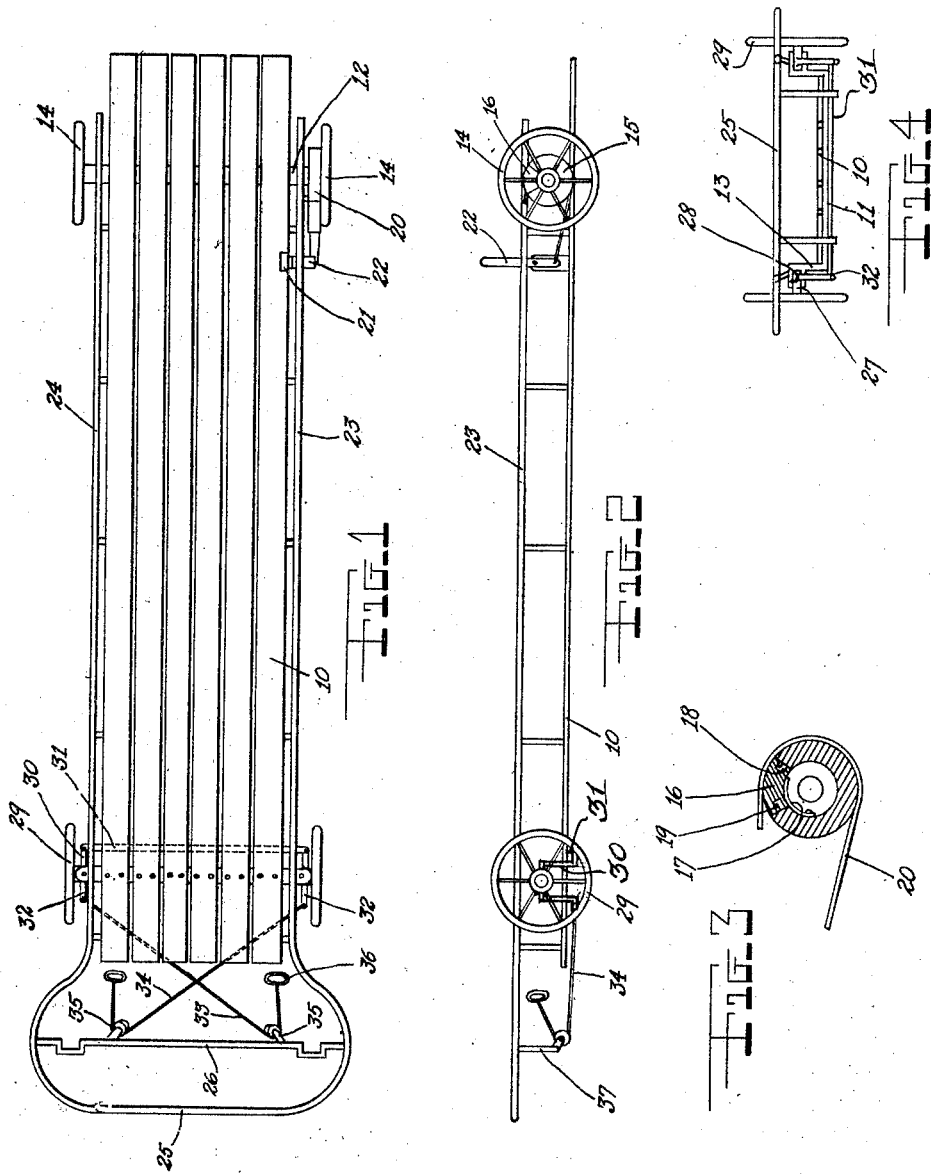
INVENTOR
F.B.Lier
BY  J. Ledermann
ATTORNEY Patented July 9, 1929.

1,720,488

UNITED STATES PATENT OFFICE.

FRED B. LIER, OF BROOKLYN, NEW YORK, ASSIGNOR OF FORTY PER CENT TO ADAM SEYFERT, OF NEW YORK, N. Y.

TOBOGGAN COASTER.

Application filed April 21, 1927. Serial No. 185,400.

The main object of this invention is to provide a wheeled vehicle which is adaptable for use on hills and other inclined surfaces and consists of a platform mounted on four wheels which are so constructed as to be capable of great speed, a hand operated steering mechanism, and a hand operated brake mechanism.

Another object of this invention is to provide a toboggan coaster capable of attaining relatively high speed and which is provided with a novel brake mechanism which urges a block outwardly to be contacted with by the brake band of the device.

The above and other objects will become apparent in the description below in which characters of reference refer to like-named parts in the drawing.

Referring briefly to the drawing, Figure 1 is a top plan view of the toboggan coaster.

Figure 2 is a side elevational view of the same showing the steering and braking means.

Figure 3 is a cross sectional view taken through the brake drum showing the mounting of the brake block in the drum.

Figure 4 is a front elevational view of the coaster showing the front guard rail.

Referring in detail to the drawing, the numeral 10 indicates a number of slats which are laid side by side and form a platform on which the passengers are carried. The slats are mounted on a forward and rear axle 11 and 12, respectively. These axles are U-shaped consisting of longitudinal bars from which upright arms 13 extend. The bars of the axles serve as a seat for the slats 10, which latter are secured in place by rivets or the like. The rear axle has horizontal extensions thereon on which the rear wheels 14 of the coaster are rotatably mounted.

Adjacent one of the rear wheels 14 a brake drum 15 is located. This brake drum is mounted rigid with the wheel which it lies adjacent to and has a radial portion removed therefrom. A segment 16 is loosely mounted in the space left by the removed portion of the drum. The latter is formed hollow at its axis and in the space so formed a flat spring 17 is provided which has one end riveted to the surface of the drum. The segment is arcuate in shape and is provided with a recess 18 located on opposite sides in which projecting pins 19 are housed, the pins extending from the side surfaces of the drum which bound the removed portion. The outline of the drum and its segment form an annular periphery around half of which a brake band 20 circles. An upright 21 is mounted on one of the side slats of the platform and has a brake lever 22 pivoted thereon. The lower end of the brake band 20 is secured to the lever and the opposite end attached to a peg which is mounted on the side of a guard rail. This guard consists of side rails 23 and 24 which are joined at the front by a rail 25 which serves as a bumper guard. The latter projects in front of the platform in an oval shape and has the ends of a foot bar 26 secured thereto on which rest the feet of the leading passenger.

Studs 27 are pivotally mounted between the tongues 28 of the uprights 13 on the front axle 11. These studs have the front wheels 29 rotatably secured thereon. Each stud has a rearwardly projecting arm 30 and these arms are mutually connected by a bar 31 in a pivoted manner. Additional arms 32 extend sidewise from the studs and have the ends of flexible cables 33 and 34 secured thereto. These cables are trained around pulleys 35 and mutually cross each other and at their opposite ends have loops 36 secured thereto. The pulleys are suspended from the lower ends of the legs 37 which depend from the foot bar 26.

The toboggan coaster is used for the seating of a number of persons who sit facing the front. The leading passenger places his feet on the foot bar 26 and with his hands grasps the loops 36 secured to the ends of the flexible cables 33 and 34. The rearmost passenger grasps the brake lever with one hand and with the other holds on to the guard rail 24, which all of the remaining passengers also do. In steering toward the right or the left first one or the other of the flexible cables is pulled thus rotating one or the other of the studs 28 thru the medium of the arms 32 to which the flexible cables are attached. As the rear wheel 14 having the brake drum 15 mounted on its side, is rotated the segment 16 when not retained in position by the brake band will swing slightly outward by the action of the spring 17 and will be pressed into its proper position again when it comes into contact with brake band which latter encircles only half of the drum, thereby checking its speed with greater rapidity than is possible with the usual type of brake.

It is to be noted that certain changes in form and construction may be made without departing from the spirit and scope of the invention.

I claim:

In a device of the class described having wheels, an annular drum rigid on one of said wheels, said drum being hollowed out about its center, said drum having a sector cut out therefrom, an arcuate block slidably mounted in said cut out and adapted to register therein, said block having notches in the sides thereof, pins rigid on said drum protruding into the cut out portion and into said notches, an arcuate spring attached to said drum in the hollow central portion thereof and having a free end contacting with the block to urge the latter outward, and a band encircling a part of said drum adapted to be tautened about said drum.

In testimony whereof I affix my signature.

FRED B. LIER.